Oct. 21, 1952 F. LANDGRAF 2,614,637
AIR SCREW WITH AUTOMATIC PITCH MECHANISM
Filed March 26, 1948 2 SHEETS—SHEET 2
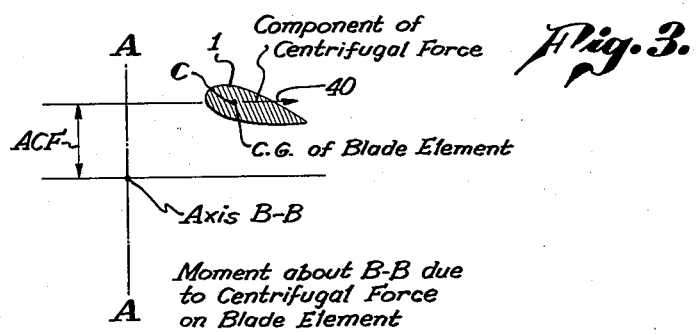
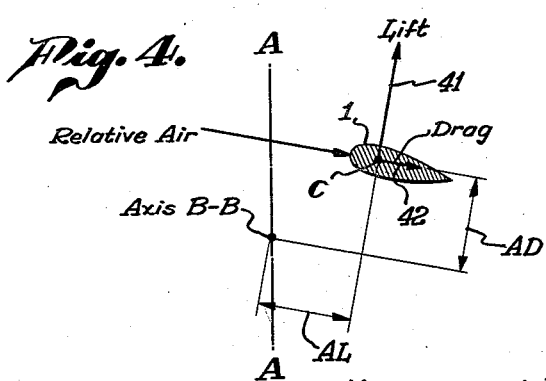
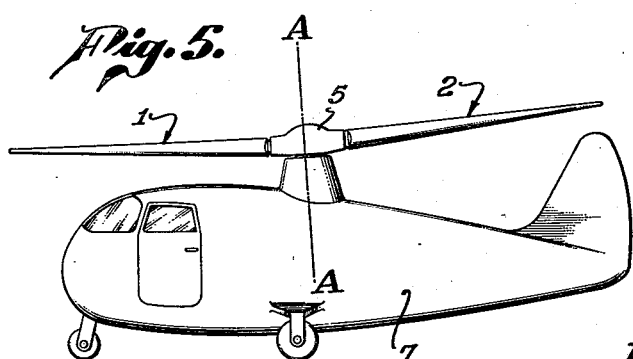
FRED LANDGRAF,
INVENTOR.
BY John Flam
ATTORNEY.

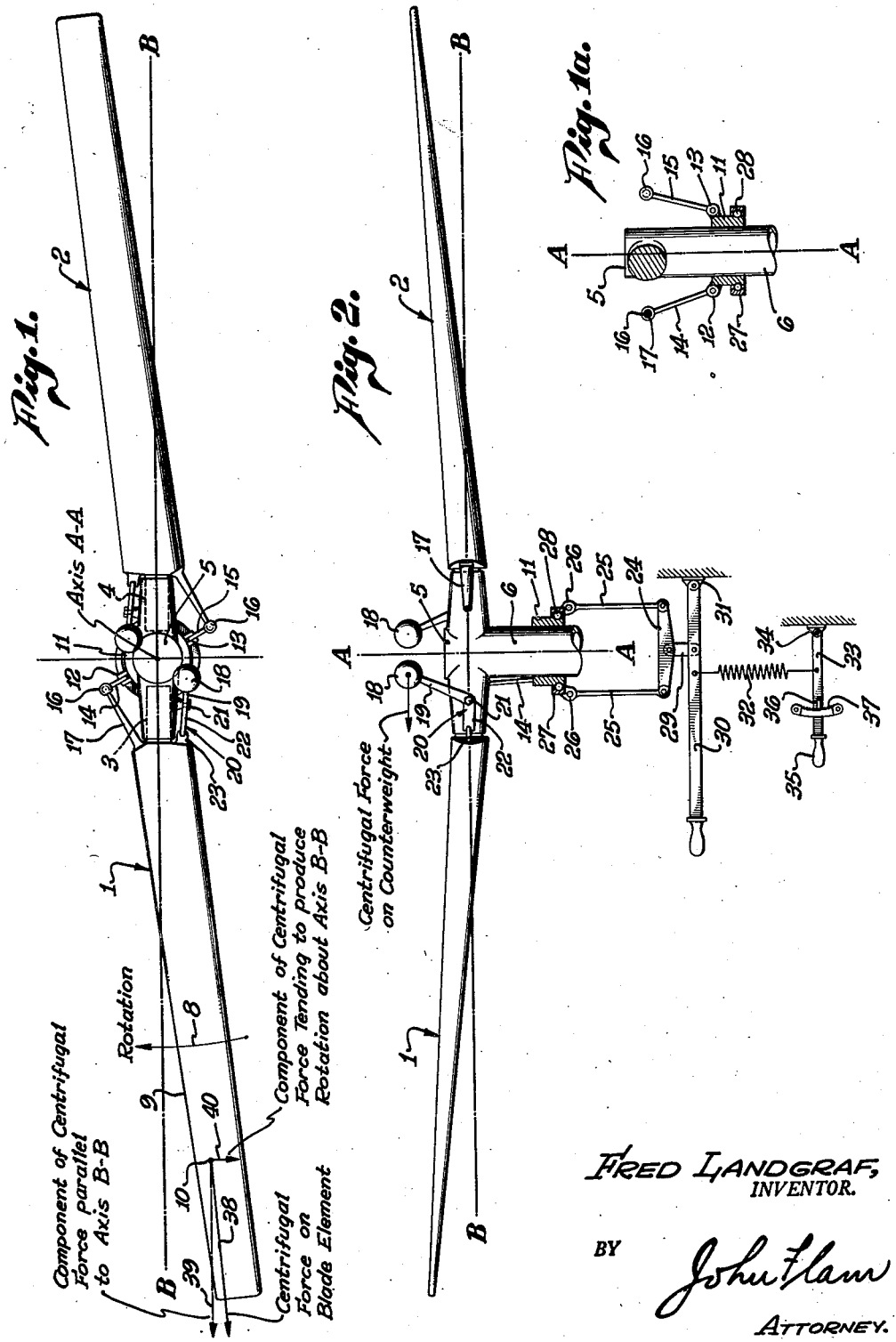

Patented Oct. 21, 1952

2,614,637

UNITED STATES PATENT OFFICE 2,614,637

AIR SCREW WITH AUTOMATIC PITCH MECHANISM

Fred Landgraf, Los Angeles, Calif.

Application March 26, 1948, Serial No. 17,205

4 Claims. (Cl. 170—160.16)

This invention relates to aircraft, and more particularly to air screws or rotors for helicopters.

Rotors of this character are often equipped with pitch controls, so that the angle of attack of each blade is adjustable to provide the desired air force acting on the rotor blades. Furthermore, each blade is preferably equipped with an aileron at its trailing edge, the angular position of which may be cyclically adjusted. One form of such an aileron control is described and claimed in a prior application, filed on December 8, 1942, under Serial No. 468,196, entitled "Helicopter," and in the name of Fred Landgraf, and which matured as Patent No. 2,443,393.

It should be understood that the invention herein described is not limited to rigid blades or to blades incorporating ailerons.

When it is desired to cause the helicopter to ascend or descend, the engine power must be increased or decreased, and the pitch of the propeller must be correspondingly altered. Moreover, in the usual type of helicopter that derives its forward speed from a forward inclination of the lifting rotor, changes in forward speed require changes in both power and blade pitch. It is difficult for a pilot to make these adjustments expeditiously and in proper synchrony.

It is one of the objects of this invention to cause adjustment of the rotor pitch to take place automatically when the pilot adjusts the engine throttle; and this adjustment is promptly effected. Thus, when it is desired to ascend, an increase in throttle opening is effected. The immediate result of the increased power is a slight increase in the rotational speed of the rotor. However, the mechanism embodied in this invention, being sensitive to changes in rotational speed, effects an increase in the pitch of the rotor blades so as to absorb the increased power at a speed only slightly higher than the speed corresponding to low power. Thus the helicopter responds to an increase in power with very little lag, since the small amount of acceleration needed in the rotating parts can be effected in a correspondingly short length of time.

On the other hand, a decrease in throttle setting and power causes a slight reduction in rotational speed, which in turn causes the automatic mechanism to reduce the rotor blade pitch. Thus it is possible to reduce power without substantially reducing the rotor R. P. M. This effect is particularly advantageous in the event of partial or complete engine failure in flight. In this condition (assuming an overrunning clutch in the power transmission system, which is well known in the art) the speed sensitive mechanism will reduce the rotor blade angle sufficiently to permit the helicopter to descend in auto-rotation at a rotor speed only slightly below the normal power-on speed, thus assuring that the blades will operate at a proper relative velocity and thus maintain an advantageous angle of attack so as to sustain the weight of the helicopter.

It is another object of this invention to make it possible to adjust the control mechanism so that the stabilized rotor speed is kept within narrow limits corresponding to the desired engine speed.

It is another object of this invention to make it possible for the pilot to adjust the blade pitch manually, should he so desire, independently of the automatic control. Such manual control is normally not needed, but may become necessary in order to properly maneuver the helicopter to effect a gentle landing without power.

When the controls to be described herein are set for a definite stabilized rotor speed, these controls are also sensitive to sudden gusts or the like, for preventing the helicopter from being seriously disturbed. It is, accordingly, another object of this invention to cause the pitch of the rotor to be decreased in response to an upward moving gust, or to be decreased in response to a downward moving gust. Thus, the angle of attack and consequently the lift of the rotor is maintained substantially constant and the gust is correspondingly ineffective to disturb the helicopter from an even course, or to induce undue loads in the helicopter structure.

It is still another object of this invention to provide a variable pitch helicopter screw in which the variations in the air load and in the speed of the rotor are interdependent for causing the pitch to assume a stabilized value.

The automatic control constitutes an embodiment of this invention and may be utilized either with single or multiple rotor helicopters.

This invention possesses many other advantages, and has other objects which may be made more clearly apparent from a consideration of the embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings:

Figure 1 is a diagrammatic plan view of an air screw embodying the invention;

Fig. 1-a is a diagrammatic view of a portion of the mechanism included in the pitch control system;

Fig. 2 is a side elevation thereof, partly broken away and illustrating the controls utilized in connection with the air screw;

Figs. 3 and 4 are diagrams explaining the mode of operation of the automatic pitch control; and Fig. 5 is a side view, mainly diagrammatic, of a helicopter embodying the invention.

The air screw is shown, in this instance, as comprising a plurality of blades 1 and 2. While any desired number of blades may be used, two only are shown for the sake of simplicity. Each of the blades is attached to a stub shaft 3 and 4 angularly adjustable about axis B—B in a hub structure 5, for varying the pitch. This hub structure 5 is shown as joined to a vertically extending hollow shaft 6 rotated about an axis A—A, as by an appropriate source of power in the fuselage 7 of the helicopter.

As shown most clearly by arrow 8 in Fig. 1, the rotor is driven about the axis A—A in a clockwise direction. Furthermore, the blades are each arranged so that they are inclined slightly to axis B—B, thus a major portion of the advancing edge 9 of each of the blades is aft of the axis B—B. In addition, each of the blades, as shown most clearly in Fig. 2, extends upward at a slight angle from the axis A—A.

These conditions are also illustrated in Figs. 3 and 4 in which the two axes are diagrammatically illustrated. A typical section of the blade taken at a point 10 of Fig. 1 is shown in its relation to the axes A—A and B—B. The center of gravity or center of action of the section area is indicated at point C.

A clockwise rotation of the blade section as viewed in Figs. 3 and 4 about the axis B—B would cause the pitch to be increased; and, similarly, a counterclockwise rotation would cause a decrease in the pitch. The manner in which this increase and decrease of pitch may be secured will now be described.

Shown diagrammatically in Figs. 1 and 2 is a collar 11 which is slidable on the exterior surface of the shaft 6. This collar carries a pair of sets of ears 12 and 13 (Fig. 1-a) at its upper edge, to which are pivotally joined the links 14 and 15. Each of these links carries a ball socket 16.

Since each of the blades 1 and 2 is similarly controlled, the following description will be confined to blade 1.

Thus, blade 1 carries adjacent the inner end of the advancing edge 9 an arm 17 provided with a ball fitted in socket 16. Upward movement of collar 11 causes a corresponding upward movement of arm 17 and an increase in the pitch of the blades. Conversely, a downward movement of collar 11 serves to reduce the pitch.

A resilient force is applied to the collar 11, tending to pull the links 14 and 15 downwardly to decrease the pitch. Diagrammatically, this mechanism includes a yoke 24. This yoke 24 is provided with the links 25 that are connected, as by the ears 26, to a collar 27 surrounding the collar 11. In order to permit the collar 11 to rotate freely, while the yoke 24 is not rotated, a ball bearing structure 28 may be interposed between the collars 11 and 27.

A short link 29 connects the yoke 24 with a lever 30. This lever 30 is pivoted on a clevis 31 which may be supported within the helicopter fuselage.

Urging the lever 30 downwardly is a tension spring 32 joined at its upper end to the lever 30. At its lower end it is connected to another lever 33, also supported within the fuselage and pivoted about a clevis 34. This lever 33 has an end 35 which carries a pawl 36 engaged in the teeth of a ratchet plate 37. The tension of the spring 32 can thus be adjusted by appropriate movement of the lever 33.

Also influencing the pitch is a device operating in response to speed of rotation about axis A—A. For this purpose, a counterweight 18, influenced by centrifugal force, is shown accommodated on one arm 19 of a bell crank lever 20. This bell crank lever 20 is pivotally supported, as by the aid of a pin 21 supported on the hub structure. The other arm 22 of the bell crank lever 20 is bifurcated to accommodate the end of a short arm 23 located adjacent the trailing edge of the blade 1 and fixed to the blade.

An increase of speed will cause the counterweights 18 to move outwardly with respect to the axis A—A, and the bell crank lever 20 is moved in a counter-clockwise direction. This movement would thus cause an increase in the pitch of the blade, since the trailing edge is depressed. Similarly, a reduction in speed would cause the weight 18 to move inwardly, and the pitch would be correspondingly reduced.

In addition to the force due to spring 32, and the centrifugal force operating on weight 18 to modify the pitch of the blade, the air load operating on the blade also creates a torque for determining the pitch. As is well known in the art, the air force on an airfoil may be considered to be composed of a lift component which is perpendicular to the relative air, and a drag component which is parallel to the relative air. The above described relationship is shown diagrammatically in Fig. 4. In order to attain one of the objects of the invention, namely, that an increase in air load (as, for example, that caused by an upward moving gust) shall cause a decrease in blade pitch, and conversely that a decrease in air load (as might result from a downward moving gust) shall cause an increase in blade angle, it is essential to the operation of the mechanism herein described, that the resultant moment (about axis B—B) of all of the lift and drag forces acting along the length of the blade in such a direction as to tend to decrease the blade pitch. Referring to Fig. 4, the resultant moment due to air loads should, therefore, be in a counter-clockwise direction.

Referring now to the diagrams shown in Figs. 3 and 4, the torques about axis B—B, influencing the pitch, are diagrammatically illustrated. The value of the centrifugal force at a characteristic blade element, as, for example, point 10 in Fig. 1, is represented by the full arrow 38 in Fig. 1. One component 39 of the centrifugal force is parallel to the axis B—B and is, therefore, ineffective to produce rotation about that axis. The other component 40 is directed normal to the axis B—B and produces a torque tending to rotate the blade 1 in a clockwise direction, as viewed in Fig. 3. The effective torque arm is represented by the distance ACF, shown in Fig. 3, which is the distance from the axis B—B to the center of gravity of the blade element at the point 10. Accordingly, an increase in centrifugal force due to an increase in speed tends to produce an increased pitch.

The torque set up by the relative air load with respect to the blade 1 is diagrammatically indicated in Fig. 4. This force, due to relative air, can be resolved into a lift component 41 and a drag component 42. The drag component is relatively small, and its lever arm is represented by the distance AD. This drag torque tends to increase the pitch. The torque due to the lift 41 has an arm AL. Since the lift component 41 is much greater than the drag component, the ultimate effect is that the resultant air force produces a torque in a counter-clockwise direction. Assuming that this torque is held in equilibrium by other forces within the system, as will be hereinafter described, it is apparent from the preceding explanation that an increase in resultant air force tends to decrease the blade pitch, thereby relieving the load, whereas a decrease in resultant air force tends to increase the blade pitch, thereby augmenting the load.

The discussion just completed applies to a particular blade element 10, Fig. 1. In a similar way, the resultant moment about axis B—B at other points along the span may be evaluated. By combining the effects at all of the elements of a blade, the total moment about axis B—B due to all of the air forces and centrifugal forces acting upon the blade may be evaluated. Furthermore, it is apparent from Figs. 3 and 4 that the ability of the blade to respond to variations in air load will be dependent upon the amount that the blade is swept back with respect to axis B—B. The magnitude of the moments about axis B—B due to centrifugal forces (opposing the moments due to air loads) will depend upon both the amount of sweep-back and the distance that the centers of gravity of the various blade elements are disposed above the axis B—B. To augment the moment about axis B—B due to centrifugal forces, the centrifugal counterweights 18 are provided as hereinbefore described in detail. Thus, by proper proportions between the blade weight, sweep-back, and upward inclination, blade counterweight and linkage, and spring characteristics, the entire system may be designed to be in equilibrium at any desired rotational speed.

By the aid of the controls illustrated, the speed of rotation of the air screw is maintained substantially constant irrespective of varying air conditions. Thus, with the spring force 32 tensioned to a definite amount, the torques due to the relative air load and the centrifugal force are in balance with the spring force 32. Any increase in speed about axis A—A will increase the centrifugal force, and the pitch will be momentarily increased. As soon as the pitch is increased, a greater load is imposed upon the rotor and it will slow down. The air force, however, is such that it opposes the effect of the centrifugal force, and the blade finally comes to a stable position in which the speed of rotation is stabilized.

Should a sudden gust of air be encountered, the helicopter will not be seriously disturbed, since the relative air force being momentarily increased causes an increase in the counter-clockwise torque, as viewed in Fig. 4, that would reduce the pitch and thereby render the gust substantially ineffective.

Should the pilot wish to alter the speed of rotation (as, for example, to permit cruising at a reduced engine speed, or to permit take-off at maximum take-off power), he can adjust the tension of the spring 32 by an adjustment of the lever 35. This automatically causes readjustment of the relative air load and of the centrifugal force. All of the three forces finally stabilize at the new, required speed.

If he so desires, the pilot can, at any time, override the automatic control and manually adjust the pitch to suit his requirements by moving the lever 30, since this lever 30 has a direct mechanical connection with the blades, and the adjustment can be held in any desired position by the hand of the pilot.

This procedure might be desirable under emergency conditions, as, for example, just before contact with the ground in a power-off landing when it would be advantageous to suddenly increase the blade pitch so as to utilize the rotational energy of the rotor to retard the rate of descent.

The diagrammatic representations of the controls utilizing air loads and the centrifugal forces are merely illustrative of obvious mechanical means to produce the desired effects. Even when the air screw blades are provided with ailerons at the trailing edges, the forces on these ailerons neutralize each other when all of the blades are considered, and they can be ignored in the analysis of the forces.

The inventor claims:

1. In a rotatable air screw for helicopters having an axis of rotation that provides the sustaining lift against gravity: a plurality of blades adjustable about an axis that is transverse to said axis of rotation, for adjusting the pitch; said blades having leading edges that are inclined rearwardly of the said transverse axis, for all adjustments of the blades, the centers of gravity of the sections along at least a portion of each blade being above the said axis of adjustment; the blades having trailing edges below the leading edges, so that the relative air acting on the blades produces a torque on the blade in a direction to reduce the pitch; means responsive to the speed of rotation about said axis of rotation for producing a torque on the blade about said axis of adjustment, said torque increasing with speed; and means providing a resilient force opposing said torque.

2. In an air screw rotatable about a substantially vertical axis: a plurality of blades; means for pivotally supporting said blades respectively about angularly spaced substantially horizontal axes for varying the effective pitch of the screw; each of the blades having a leading edge and a trailing edge below the leading edge; each blade having a major portion swept back of its respective pivotal axis; the relative air acting on the blade thereby serving to exert a torque on the blade about the blade pivot in a direction to reduce the pitch; and means responsive to the speed of rotation of the air screw for exerting a torque on the blade about the said pivotal axis of each blade in a direction to increase the pitch upon an increase in speed; said torques serving to move each blade to a position where the rotational forces thereon about its pivotal axis are balanced.

3. In an air screw rotatable about a substantially vertical axis: a plurality of blades; means for pivotally supporting said blades respectively about angularly spaced substantially horizontal axes for varying the effective pitch of the screw; each of the blades having a leading edge and a trailing edge below the leading edge; each blade having a major portion swept back of its respective pivotal axis; the relative air acting on the blade thereby serving to exert a torque on the blade about the blade pivot in a direction to reduce the pitch; means for exerting a torque on the blades about the said pivotal axis of each blade in a direction to increase the pitch upon an increase in speed; and resilient means urging the blade about its pivotal axis in a direction to reduce the pitch; the torques serving to move each blade to a position where the rotational forces thereon about its pivotal axis are balanced.

4. In an air screw rotatable about a substantially vertical axis: a plurality of blades; means for pivotally supporting said blades respectively about angularly spaced substantially horizontal axes for varying the effective pitch of the screw; each of the blades having a leading edge and a trailing edge below the leading edge; each blade having a major portion swept back of its respective pivotal axis; the relative air acting on the blade thereby serving to exert a torque on the blade about the blade pivot in a direction to reduce the pitch; means for exerting a torque on the blades about the said pivotal axis of each blade in a direction to increase the pitch upon an increase in speed; resilient means urging the blade about its pivotal axis in a direction to reduce the pitch; the torques serving to move each blade to a position where the rotational forces thereon about its pivotal axis are balanced; and means for independently adjusting the pitch of the blades.

FRED LANDGRAF.

REFERENCES CITED

The following references are of record in the file of this patent:

UNITED STATES PATENTS

| Number | Name | Date |
|---|---|---|
| 1,364,755 | Henington | Jan. 4, 1921 |
| 1,405,643 | Weaver | Feb. 7, 1922 |
| 1,852,500 | Zipay | Apr. 5, 1932 |
| 1,857,036 | Wisk | May 3, 1932 |
| 2,021,999 | Hoffmann | Nov. 26, 1935 |
| 2,054,947 | Riddle | Sept. 22, 1936 |
| 2,216,162 | Cierva | Oct. 1, 1940 |
| 2,219,288 | Avery | Oct. 29, 1940 |
| 2,233,747 | Riedl | Mar. 4, 1941 |
| 2,359,265 | Hackethal | Sept. 26, 1944 |